(12) United States Patent
Nevatie et al.

(10) Patent No.: US 9,948,834 B2
(45) Date of Patent: Apr. 17, 2018

(54) METHOD AND APPARATUS TO DETERMINE ADDED GRAPHICS LAYERS IN A VIDEO IMAGE SIGNAL

(71) Applicant: Supponor Oy, Espoo (FI)

(72) Inventors: Niko Nevatie, Espoo (FI); Dmitry Sushko, Espoo (FI)

(73) Assignee: Supponor Oy, Espoo (FI)

( * ) Notice: Subject to any disclaimer, the term of this patent is extended or adjusted under 35 U.S.C. 154(b) by 0 days.

(21) Appl. No.: 15/586,968

(22) Filed: May 4, 2017

(65) Prior Publication Data

US 2017/0324889 A1   Nov. 9, 2017

(30) Foreign Application Priority Data

May 6, 2016   (GB) .................................. 1607999.8

(51) Int. Cl.
| | |
|---|---|
| *H04N 9/74* | (2006.01) |
| *H04N 9/76* | (2006.01) |
| *H04N 5/268* | (2006.01) |
| *H04N 5/067* | (2006.01) |
| *H04N 5/265* | (2006.01) |
| *H04N 5/235* | (2006.01) |

(52) U.S. Cl.
CPC .......... *H04N 5/0675* (2013.01); *H04N 5/2352* (2013.01); *H04N 5/265* (2013.01)

(58) Field of Classification Search
CPC ...... H04N 5/262; H04N 5/45; H04N 5/44504; H04N 5/278; H04N 5/268; H04N 5/272; H04N 5/0675; H04N 5/2352; H04N 5/265; H04N 5/2723; H04N 5/275; H04N 5/222; H04N 9/74; H04N 9/75; H04N 9/76

USPC ................ 348/584–592, 598–601, 705, 706; 345/629–641
IPC ............................. H04N 9/74,9/75, 9/76, 5/268
See application file for complete search history.

(56) References Cited

U.S. PATENT DOCUMENTS

| | | | | |
|---|---|---|---|---|
| 2008/0084508 A1* | 4/2008 | Cole | ....................... | H04N 5/275 348/744 |
| 2010/0289960 A1 | 11/2010 | Rantalainen et al. | | |
| 2015/0055019 A1 | 2/2015 | Suontama et al. | | |
| 2016/0037081 A1* | 2/2016 | Socal | ................... | H04N 5/2723 348/659 |
| 2016/0156893 A1* | 6/2016 | Bogusz | .................... | H04N 9/75 348/587 |

FOREIGN PATENT DOCUMENTS

| | | |
|---|---|---|
| GB | 2511792 A | 9/2014 |
| GB | 2529879 A | 3/2016 |

(Continued)

*Primary Examiner* — Sherrie Hsia
(74) *Attorney, Agent, or Firm* — Murphy, Bilak & Homiller, PLLC (57) ABSTRACT

An original image layer is mixed with one or more graphics layers to form a composite video signal, such as in a vision mixer. Also, the same graphics layers are mixed identically into another, known background image layer to give a second composite video signal. The currently applied added graphics layers are determined, without directly accessing the added graphics layers themselves, using only the first and second composite video signals, the original image layer, and the known background image, such as in a graphics layer detection device. A triangulation matting algorithm may be used in one example.

15 Claims, 4 Drawing Sheets

(56) References Cited

FOREIGN PATENT DOCUMENTS

| WO | 2012143596 A1 | 10/2012 |
|----|---------------|---------|
| WO | 2016023953 A1 | 2/2016  |

\* cited by examiner

METHOD AND APPARATUS TO DETERMINE ADDED GRAPHICS LAYERS IN A VIDEO IMAGE SIGNAL

RELATED CASES

The present application claims priority from application GB1607999.8 filed in United Kingdom on 6 May 2016, the entire content of which is incorporated by reference herein.

BACKGROUND

The present description relates generally to a device that determines added graphics layers within a video image signal. Such a device is useful for example in the field of image content replacement, in which an apparatus detects a target area in one or more regions of an image, and which may replace the target area with alternate content. In some examples, a dynamic image content replacement system is described that is suitable for use with live television broadcasts.

In the related art, one or more target areas within a video image signal are defined and then replaced with alternate images appropriate to specific viewer groups or geographical regions. For example, billboards at a ground or arena of a major sporting event are observed as part of a television broadcast, and these target areas are electronically substituted by alternate images that are more appropriate for a particular country or region. In particular, such a system is useful to create multiple television feeds each having different electronically generated advertisement content which is tailored according to an intended audience. For example, a number of feeds are produced each having differing content (e.g. a billboard in the original images is modified to carry advert 1 for country 1, while advert 2 is added for region 2, and so on). This situation is particularly relevant for an event of worldwide interest which is to be broadcast to a large number of countries or regions and where it is desired to dynamically modify the video images appropriate to each specific audience.

A difficulty arises in that television feeds typically have multiple image layers which are mixed together. For example, camera images of a sports event are often overlaid with one or more graphics layers. These graphics layers may be used, for example, to provide additional information for the viewer, such as the broadcaster, current score, teams, athletes or various statistics. Different graphics layers may be applied at different times during a transmission or event. The graphics layers are often semi-transparent, allowing the original image also to be partly viewed. Further, various transformation functions may be applied during mixing (e.g. animations or fading of graphics layers, etc.). Thus the composite video signal after mixing is a complex combination of the original image signal with the graphics layers.

Typically, the graphics layers are provided from multiple sources and are added by a vision mixer device to form the composite video signal during a live transmission. However, gaining accurate information about those added graphics layers is difficult. For example, it has previously been necessary to separately monitor each graphics signal which is input into the vision mixer device, such as by running cables from inputs of the mixer to a monitoring station. Often, a large number of cables or connections are needed, considering that each graphics layer may need two signal inputs (often termed the 'fill' and 'key'), and the required number of connections may exceed a capacity of the monitoring station (i.e. the monitoring hardware has only a finite number of inputs). Connecting the monitoring cables is sometimes intrusive and labour-intensive. The monitoring cables are subject to being misconnected, or may become incorrectly assigned following changes at the mixer device. The cables sometimes suffer damage during use (e.g. a cable break), which is highly disruptive during a live transmission. Further, the monitoring station typically needs to be precisely calibrated relative to each graphics layer which is to be used during transmission (e.g. precisely aligning the content of each graphics layer as inputs to the vision mixer compared with how those image components appear in the produced composite video signal).

Considering the related art, there is still a difficulty in providing a reliable and effective device for determining one or more graphics layers which have been included within a composite video image. Also, it is desired to be able to dynamically modify the composite video image signals in a way which is accurate and photo-realistic for the viewer, which would be enhanced by determining the added graphics layers at each moment in time. Further, there is an ongoing desire to improve the flexibility for configuring the system, so that the system may be installed and commissioned more readily alongside other existing video processing equipment, which may well be owned or operated by different parties.

It is now desired to provide an apparatus and method which will address these, or other, limitations of the current art. As will appreciated from the discussion herein, at least some of the example embodiments allow graphics layers within a composite video to be detected or derived indirectly, i.e. without receiving an explicit definition of the added graphics layers. Further, in some examples, many of the other difficulties of the previous approaches are also alleviated.

SUMMARY

In one example there is described a system for determining added graphics layers in a video image signal. The system includes a vision mixer configured to produce at least a first original image signal comprising a first original image layer, a first composite image signal having one or more graphics layers mixed into the first original image layer, and a second composite image signal having the said one or more graphics layers mixed likewise into a second original image layer which is distinct from the first original image layer. The system also includes a graphics layer detector device coupled by communication links to the vision mixer to receive at least said first original image layer signal, said first composite image signal, and said second composite image signal and configured to output an added graphics layer signal (detected graphics signal) representing said one or more graphics layers, the added graphics layer signal being derived from the first original image layer, the second original image layer, the first composite image signal, and the second composite image signal.

In one example, the first original image signal is a clean feed signal formed by selecting between a plurality of camera feed signals. In one example, the first composite image signal is a broadcast feed signal having the one or more graphics layers mixed into the clean feed signal. In one example, the second original image layer provides a constant image within the vision mixer and within the graphics layer detection device. In one example, the second original image layer is established by a constant background signal which appears consistently in both the vision mixer and the graphics layer detection device. In one example, the constant background signal is a constant colour signal, obtained such as by maintaining a known colour across an entire image frame and conveniently also from frame to frame. In other examples the constant background might change over time, e.g. as a video sequence, with appropriate synchronisation between the vision mixer and the graphics layer detection device. In one example, the constant background signal is shared between the vision mixer and the graphics layer detection device. In one example, the constant background signal is communicated to the vision mixer from the graphics layer detection device. In one example, the constant background signal is established independently but equivalently in the vision mixer and in the graphics layer detection device. In one example, the vision mixer is configured to apply the one or more graphics layers identically to the first original image layer and to the second original image layer within respective synchronous or otherwise corresponding image frames.

In one example, the graphics layer detector device is configured to derive the added graphics layers using triangulation matting. In one example, the graphics layer detector device assuming an RGB colour space and considering at each pixel position the first original image layer as Rk1 Gk1 Bk1, the second original image layer as Rk2 Gk2 Bk2, the first composite image signal as R1 G1 B1, and the second composite image signal as R2 G2 B2 solves for the four unknowns Ro Go Bo αo representing the said added graphics layers the system of six equations:

$$R_1 = \alpha_o R_o + (1-\alpha_o) R_{k1}$$

$$R_2 = \alpha_o R_o + (1-\alpha_o) R_{k2}$$

$$G_1 = \alpha_o G_o + (1-\alpha_o) G_{k1}$$

$$R_2 = \alpha_o G_o + (1-\alpha_o) G_{k2}$$

$$R_1 = \alpha_o B_o + (1-\alpha_o) B_{k1}$$

$$R_2 = \alpha_o B_o + (1-\alpha_o) B_{k2}$$

In one example, the graphics layer detector device is further configured to perform a validation function using the added graphics signal (detected graphics signal) to detect transient deviations in the video signal, and to output a validation signal in response thereto.

In one example, the validation function comprises at least one of: generating a first reconstructed composite image signal by combining the first original image signal with the detected graphics signal, and comparing the first reconstructed composite image signal with the video signal to provide a first validation indicator; and generating a second reconstructed composite image signal by combining the constant background signal with the detected graphics signal, and comparing the second reconstructed composite image signal with the second composite video signal to provide a second validation indicator.

In one example, the first and second validation indicators are first and second peak signal-to-noise ratios, PSNRs, respectively, and the validation signal is a minimum of the first and second PSNRs.

In one example there is described a device to detect graphics layers added into a video signal, wherein the device is configured to: receive at least a first original image layer, and a first composite image having one or more graphics layers mixed into the first original image layer; establish a second original image layer which is different from the first original image layer; obtain a second composite image having the said one or more graphics layers mixed likewise into the second original image layer; derive an added graphics signal (detected graphics signal) representing the one or more added graphics layers from the first original image layer, the second original image layer, the first composite image, and the second composite image; and output said added graphics signal.

In one example there is described a method for determining added graphics layers in a video image signal, comprising: receiving at least a first original image layer, and a first composite image having one or more graphics layers mixed into the first original image layer; establishing a second original image layer which is different from the first original image layer; obtaining a second composite image having the said one or more graphics layers mixed likewise into the second original image layer; deriving an added graphics layer signal representing the one or more added graphics layers from the first original image layer, the second original image layer, the first composite image, and the second composite image; and outputting said added graphics layer signal.

In one example, there is provided a computer device which is configured to perform any of the functions or methods mentioned herein. In one example there is provided a tangible non-transient computer readable medium having recorded thereon instructions which when executed cause a computer to perform any of the functions or methods defined herein.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

The example embodiments will be described with reference to a content replacement system, or more generally an apparatus and method for image content manipulation. For example, the system may be used to replace content within television video images and particularly to provide photo-realistic replacement of a billboard for live television broadcasts. However, the methods and apparatus may be applied in many other specific implementations, which may involve other forms of video images or relate to other subjects of interest, as will be apparent to persons skilled in the art from the teachings herein.

Generally, an original image layer is mixed with one or more graphics layers to form a composite video signal, such as in a vision mixer. Also, the same graphics layers are mixed identically or equivalently into another, known background image layer to give a second composite video signal. The currently applied added graphics layers are determined, without directly accessing the added graphics layers themselves, using only the first and second composite video signals, the original image layer, and the known background image, such as by a graphics layer detection device. A triangulation matting algorithm may be used in one example.

In one example, the described system determines the graphics layers which have been added during vision mixing, so that those added graphics layers may be preserved when alternate content has been substituted into the video images. Thus, a more pleasing and photo-realistic result can be achieved in the output images. Advantageously the ordinary viewer now does not notice that a content substitution is performed. In particular, the content substitution process performed by the system does not detract from the viewer's enjoyment of the eventual images. The system thus maintains value in the images for the broadcaster and for interested parties (e.g. advertisers or sponsors) whose content has been inserted by the system into the original images.

The described example system is able, at least in some situations, to derive the added graphics layers with significant practical improvements. For example, initial set-up of the system is simplified, especially by reducing a number of required connections. Exposure to human error (e.g. wrong connections or unnoticed changes between initial connection and live broadcast) and mechanical failure (e.g. cable breaks) are reduced. Calibrations of the system prior to operation are reduced. Previously used complex calculations or approximations are now not needed, while still producing an accurate and useable result.

Figure 1:
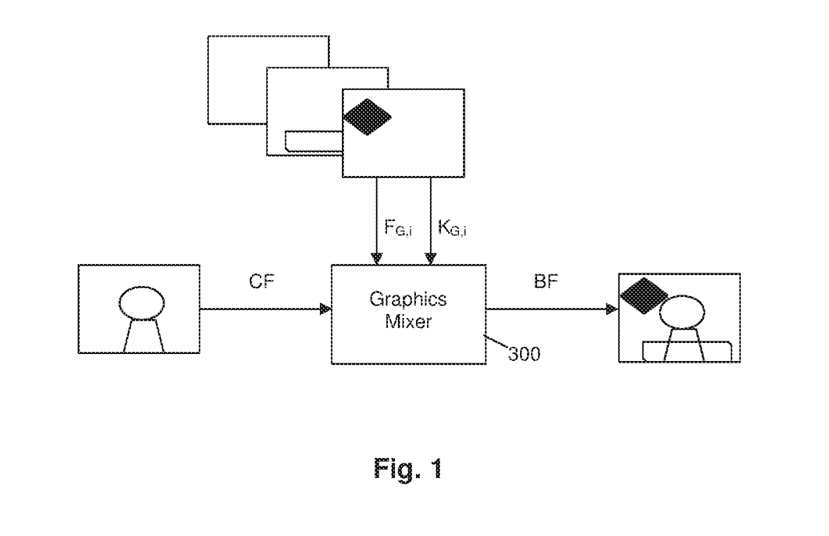
FIG. 1 is a schematic diagram of an example vision mixer device showing a graphics overlay mixing operation.

FIG. 1 is a schematic diagram of a vision mixer device 300 which performs a graphics mixing operation, as may be applied in the example system or coupled thereto. Typically, the vision mixer 300 is a dedicated device and is suitably located in a professional television production environment such as a television studio, a cable broadcast facility, a commercial production facility, a remote truck or outside broadcast van ('OB van') or a linear video editing bay.

In this example, a graphics overlay image signal ('fill') $F_G$ is added to an incoming video image signal CF in relation to a graphics control signal ('key') $K_G$ to produce an outgoing composite video image signal BF. The mixing operation can be expressed by the following equation:

$$BF=Mix(CF,F_G,K_G)$$

In this equation, 'Mix' is the compositing or mixing functions applied by the vision mixer 300, and can have many different specific forms as will be familiar to those skilled in the art. Generally, the signals each represent still images or video image frames which may be constructed by arrays of pixels as a two-dimensional grid. The fill represents the visual content of the image (e.g. colour or greyscale pixel values—such as RGB pixel values), while the key represents the relative transparency (density) of that image layer at each pixel position. In one example, the graphics fill signal $F_G$ is an image signal which will align with one or more regions of the image area of the incoming clean feed picture signal CF. The graphics key signal $K_G$ controls or informs the mixing operation, and in some examples is an alpha channel α. The graphics key signal $K_G$ may represent a graphics percentage of coverage (i.e. graphics %) that affects a relative transparency of the graphics fill signal $F_G$ when mixed with the clean feed picture signal CF. More generally, the graphics key signal $K_G$ suitably defines an intended coverage for each pixel, or each group of pixels, within the relevant image area which is to be modified by the graphics overlay, so that the graphics fill signal $F_G$ is mixed with the clean feed picture signal CF in a proportion set by the coverage in the graphics key signal $K_G$.

It will be appreciated that multiple graphics layers may be applied together or sequentially over an original or initial image layer, and that each of these graphics layers may have corresponding fill and key components as inputs to the mixer 300. Each additional graphics layer can thus be considered as comprising the respective fill $F_{Gi}$ and key $K_{Gi}$ components (where i is a positive integer). The term graphics layer has been used here for convenience, but it will be appreciated that each layer may contain any suitable image content.

Figure 2:
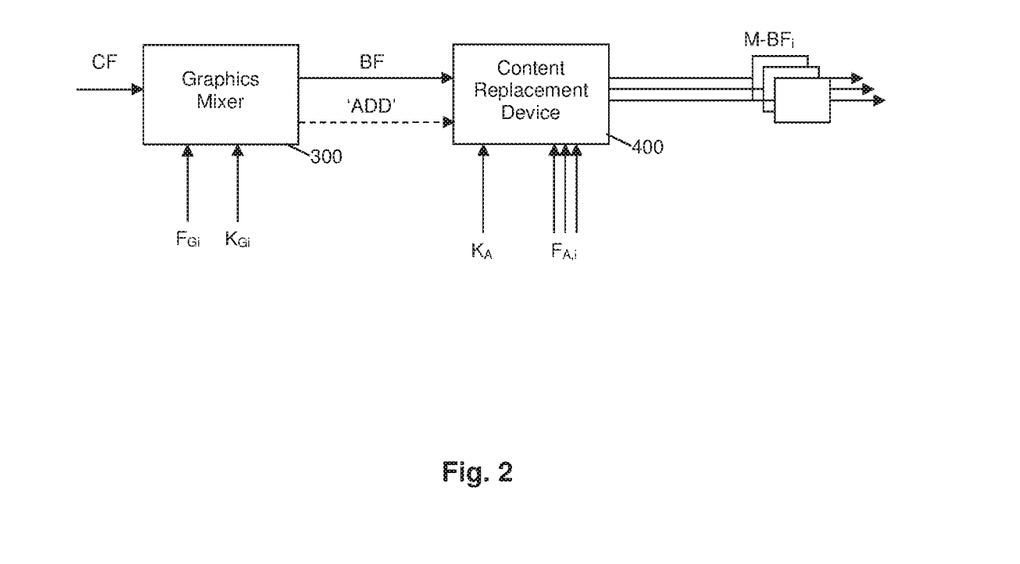
FIG. 2 is a schematic diagram of an example content replacement device showing a content substitution operation.

FIG. 2 is a schematic view of a content replacement device 400 which performs a content substitution operation. The content replacement device 400 in one example is constructed as dedicated equipment and/or may include one or more computers having storage, memory, processors and network connections as will be familiar to those skilled in the art.

In this illustrative example, a received video signal BF is modified by an alternate image content signal $F_A$ according to a target area key signal $K_A$ to produce a modified video image signal M-BF. The content substitution operation may need to be repeated several times, using different alternate images $F_{A,j}$, in order to produce respective modified image signals M-BF$_1$, M-BF$_2$ . . . M-BF$_j$ where j is a positive integer. The content substitution operation may be described by the equation:

$$M\text{-}BF_j=Mix(BF,F_{A,j},K_A)$$

In this example, the target area key signal $K_A$ defines a target area of the incoming video signal BF which is to be modified or replaced. Typically, the non-target areas of the original video signal are to be left unaltered, and hence the target area key signal $K_A$ identifies those regions or portions which are to be modified.

In one example, the target area key signal $K_A$ is suitably defined as a numerical percentage value which will be applied to each pixel or group of pixels in the image area. For example, zero percent (e.g. the value 0) indicates that the original image remains as originally presented, whilst one hundred percent (e.g. the value 1 or 255) indicates that the original image is to be completely replaced at this position. Further, the target area key signal $K_A$ may define partial replacement by a value greater than zero and less than one hundred percent, indicating that the original image will persist proportionately at that position and thus a semi transparent replacement or modification is performed with the original image still being partially visible. For example, such semi-transparent portions are useful in transition regions at a boundary of the target area to improve a visual integration of the alternate content with the original images. In this example, the program signal BF is received from the mixer 300 having the graphics already inserted therein and is altered by the alternate content $F_A$ in the target area defined by $K_A$. Meanwhile, the one or more graphics layers in the received program signal BF are to be preserved. Hence, it is important for the content replacement device 400 to receive inputs which allow those graphics layers to be determined within the composite image signal BF and thus preserved in the modified image signals M-BF. To that end, the content replacement device 400 typically receives a set of additional monitoring signals (here shown generally as 'ADD') from the vision mixer 300, which then allow the content replacement device 400 to determine and preserve the one or more graphics layers which have been added. However, the nature and content of those additional signals is significant, as will be appreciated from the discussion herein.

Figure 3:
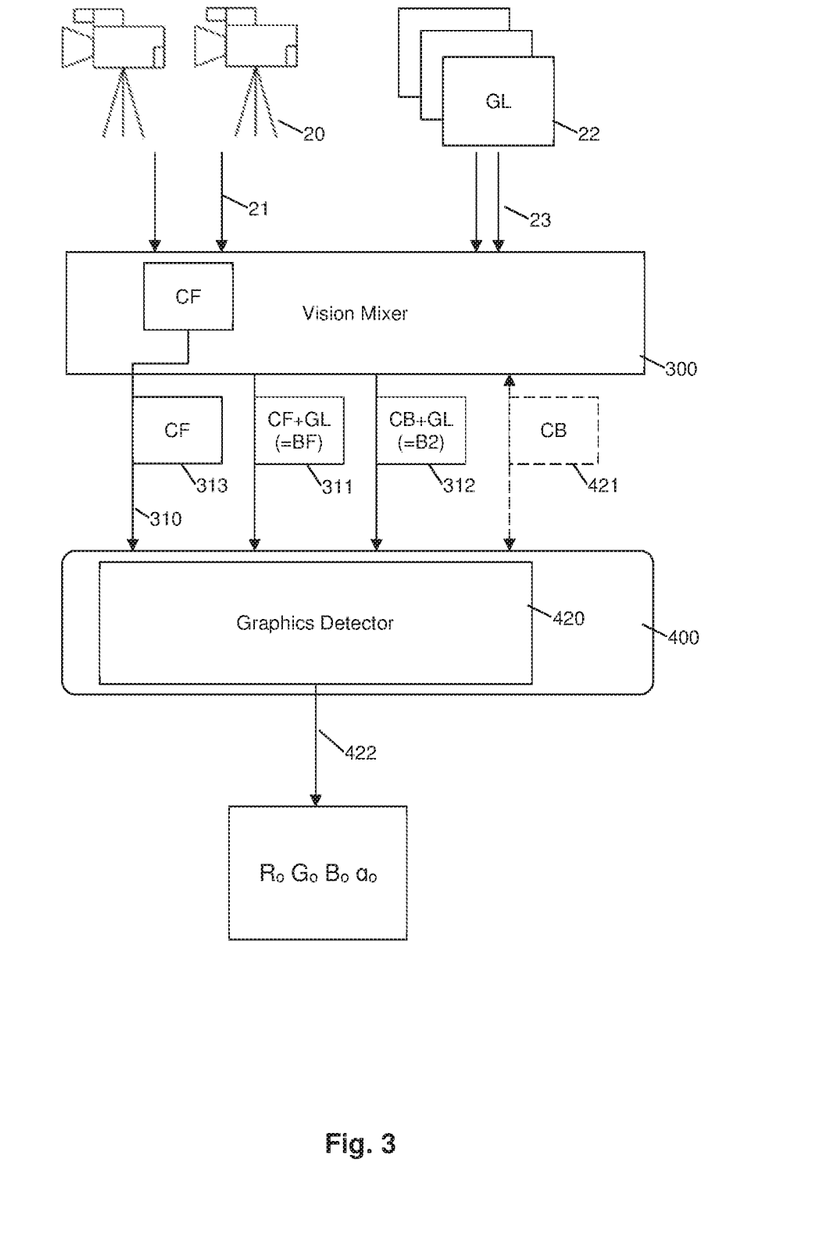
FIG. 3 is a schematic view of an example device to detect added graphics layers.

FIG. 3 is a schematic view of an example system in which the vision mixer 300, as described above, is coupled to a graphics layer detection device 420. This graphics layer detection device 420 (graphics detector device) may be a separate stand-alone dedicated device or, for example, may be implemented as a function or component within the content replacement device 400 as discussed herein.

As shown schematically in FIG. 3, in this example a plurality of camera video image feed signals 21 are provided to the mixer 300, e.g. from a large number of cameras 20 located where a sporting match or other event is to be broadcast. Also, the mixer 300 suitably receives inputs 23 for one or more of the graphics layers 'GU' 22 to be added, suitably each with appropriate fill and key pairs, or generates one or more such graphics layers internally. The vision mixer 300 selects from amongst the available camera feeds 21 to provide the clean feed CF 313. Typically, only one such camera feed 21 is output at any one time during the transmission. The clean feed CF 313 in this example thus is not a composited signal, since only one image layer is present at any one time. Also, the vision mixer 300 mixes the appropriate graphics layers GL into the clean feed CF, which provides the broadcast feed BF as a first composite video signal 311. Typically the clean feed CF 313 and the broadcast feed 311 are carried from the vision mixer 300 such as to a monitor used by the director or sent onward to be broadcast or transmitted to viewers, as will be familiar to those skilled in the art.

In this example, the vision mixer 300 and the added graphics detector 420 are suitably coupled by appropriate communication links. In practice these links may take the form of a set of monitoring cables 310, which allow high-speed transmission of high definition video signals locally from the vision mixer 300 to the added graphics detector 420 (acting as a monitoring station), e.g. from one outside broadcast truck to another truck nearby. The present system advantageously allows the number of connections to be reduced, and simplifies the set of connections which are required.

In this example, the vision mixer 300 and the added graphics detector 420 are further configured or adapted to establish a constant background signal 'CB' which provides a known image signal at each given point in time (e.g. for each frame of the video images at a synchronised time point). In one example, the constant background signal is conveniently output from the added graphics detector 420 and transmitted to the vision mixer 300, such as over a cable connection 310. In one example, the constant background signal is an image feed of a constant single colour (e.g. blue), but can in principle be any image signal of any form or complexity having predictable content.

In further examples, it is sufficient for the vision mixer 300 and the added graphics detector 420 to communicate to establish the CB signal, such as by exchanging a colour value (e.g. RGB colour value) which will be applied as the CB signal thereafter. Further still, depending upon the specific equipment, it may be possible for the vision mixer 300 to be configured (e.g. via a user interface) to define the CB signal therein, and likewise for the GL detector 420, so that both equipment have established the same CB signal 421.

In this example, the vision mixer 300 is further configured or adapted to produce a second composite video signal 312, this time by mixing the same graphics layers GL now into the constant background signal CB 421. Hence the first composite video signal BF 311 and the second composite video signal 'B2' 312 are mirrors or replicas of each other, in terms of the one or more graphics layers 22 which have been applied and the manner in which those graphics layers 22 have been applied by the mixing function at this point in time. However, the first and second composite video signals 311, 312 differ from each other in terms of the original image layer to which those graphics layers were applied, i.e. wherein the first has been applied to the clean feed image signal CF while the second has been applied to the constant background image signal CB. Conveniently, the constant background signal is chosen so as to contain a colour which does not appear anywhere in the original image layer of the first composite video signal BF 311 (i.e. the CB colour value does not appear anywhere in the clean feed CF). Thus, the two initial image layers are always different at each respective pixel.

The added graphics detector 420 is configured to consider four video image signals, comprising a first original image layer, a second original image layer, a first composite image signal having one or more graphics layers mixed into the first original image layer, and a second composite image signal having the same graphics layer mixed into the second original image layer.

In this example, the graphics detector 420 is firstly provided with the constant background signal 421. As mentioned above, the CB signal may be output previously from the graphics detector 420 to the vision mixer 300 over one of the cables 310 and likewise applied internally within the graphics detector 420. For a constant and unchanging signal, the content of the constant background signal 421 may be simply stored as a respective value, e.g. a RGB colour value, which appears at each pixel. A changing signal with content that varies over time is suitably synchronised, e.g. with a certain frame delay. The graphics detector 420 secondly receives, from the vision mixer 300, the clean feed 313 representing the first original image layer, and thirdly the first composite video signal 311 (broadcast feed BF) with the graphics layers mixed therein. These signals may be supplied as auxiliary outputs from the mixer, effectively tapping into the regular feeds of the transmission system. Fourthly, the graphics detector 420 receives the special second composite video signal 312 with the graphics layers 22 mixed in this case into the constant background signal 421.

The graphics detector 420 is further configured to derive a net graphics key and a net graphics fill of the added graphics layers 22 as applied by the vision mixer 300. This graphics key and fill represent the net effect of the image changes applied within the vision mixer 300. The fill represents the changed image content (e.g. RGB colour values) compared with the original image, while the key represents the alpha channel (i.e. transparency) of those changes. In particular, the graphics detector may be configured to perform triangulation matting to derive the net key and fill values from the set of four input signals.

As will be familiar to those skilled in the art, various approaches exist for calculating the content of an image signal and in particular to extract an object of interest from a remainder of the image (i.e. matting). Triangulation matting has been known since at least 1996 and is relatively well described in the art, but is difficult to apply in practice. However, in the system which has been discussed above, the process of triangulation matting can be used with surprisingly good effect.

Typically, within the matting problem, a semi-transparent object is to be extracted from the received image. In defining the problem, consider a foreground $C_f$ and a background $C_b$ at corresponding points and $C_k$ as a known backing colour. Assuming $C_f = C_o + (1-\alpha_o)C_k$, the solution $C_o$ is determined which gives composite colour $C=C_o+(1-\alpha_o)C_b$. Hence $C_o$ gives the colour and alpha value (i.e. RGBα) for the object of interest which is to be taken from the image.

Interestingly, this process can be applied in the present situation, considering that a system of six equations with four unknowns is established. Firstly the available four signals can be represented in the form:

original image 1(CF)=backing colour $C_{k1}$= $[R_{k1}G_{k1}B_{k1}]$ at pixel $p$ original image 2(CB)=backing colour $C_{k2}$= $[R_{k2}G_{k2}B_{k2}]$ at $p$ composite 1(CF+GL)=composite colour $C_1=R_1G_1B_1$ at $p$ composite 2(CB+GL)=composite colour $C_2=R_2G_2B_2$ at $p$ This gives a system of six equations:

$R_1=\alpha_o R_o+(1-\alpha_o)R_{k1}$ $R_2=\alpha_o R_o+(1-\alpha_o)R_{k2}$ $G_1=\alpha_o G_o+(1-\alpha_o)G_{k1}$ $R_2=\alpha_o G_o+(1-\alpha_o)G_{k2}$ $R_1=\alpha_o B_o+(1-\alpha_o)B_{k1}$ $R_2=\alpha_o B_o+(1-\alpha_o)B_{k2}$ In the example device, the graphics detector 420 is configured to solve the system of six equations for the four unknowns $R_o$ $G_o$ $B_o$ $\alpha_o$. Thus the object of interest (in this case the net effect of the added graphics layers) can be derived from the four available signals within the graphics detector 420. The graphics detector 420 outputs this added graphics signal (detected graphics signal) 'DGFX' 422 to be used elsewhere, most appropriately by being recorded onto a storage medium (e.g. hard disk or non-volatile solid state storage) or supplied to further stages within the content replacement device 400. Although a red-green-blue RGB colour space has been mentioned in this example, it will be appreciated that equivalent processing may likewise be performed for other colour spaces.

In one example, the graphics detector or the content replacement device 400 performs a validation function as described herein. However, in other examples, this validation function could be performed by any suitable hardware component. Suitably, the validation function confirms that the detected graphics signal 422 has been correctly calculated. In particular, it is desirable to detect transient conditions which could negatively affect the detected graphics signal 422.

For illustration, it is possible that a broadcaster or director who controls the vision mixer 300 wishes to insert some additional content briefly at certain times during a transmission or event, such as playing a pre-recorded ident or title sequence. This inserted content would be unrelated to the content of the first original image signal 313 (clean feed CF) being fed into the vision mixer 300 at that time and thus, at least temporarily, the content of the first composite image signal 311 (broadcast feed BF) output from the vision mixer 300 is no longer based on the expected inputs. It will be appreciated that various other example situations may also occur in practical examples which mean that the detected graphics signal 422 is now invalid, or at this moment is less accurate than expected.

This example validation function suitably involves two reconstructed signals. A first reconstructed composite image signal (here termed the 'reconstructed broadcast feed' or 'RBF' signal) is generated by combining the first original image signal 313 (e.g. the clean feed CF) with the detected graphics signal 422. This first reconstructed composite image signal should, if the system is operating as intended, match with the first composite image signal 311 (i.e. the monitored actual broadcast feed 'BF'). Hence, a comparison between BF 311 and the RBF signal produces a first useful indication of validity.

Likewise, a second reconstructed composite image signal (here termed the 'RB2' signal) may be generated by combining the second original image signal 421 (here denoted as the 'constant background' or 'CB' signal) with the detected graphics signal 422. When operating correctly, the resulting RB2 signal should match with the second composite video signal 312 ('B2') mentioned above. Comparing the RB2 signal with B2 312 provides a second validation indicator.

In one example, a single validation signal (here termed confidence signal 'CONF') is computed, and indicates a confidence or fitness level of the graphics detection at a relevant moment. For example, validation includes computing a peak signal-to-noise ratio (PSNR) between BF311 and the RBF signal, and likewise computes a PSNR between B2 312 and the RB2 signal. Here, PSNR provides a convenient mechanism for establishing a correlation between the respective pair of signals in terms of a numerical value. Other comparison mechanisms may also be appropriate. In one example, a confidence level may be calculated as a minimum of the two PSNRs, which can be represented by the expression:

$$\text{CONF}=\min(\text{PSNR}(BF,RBF),\text{PSNR}(B2,RB2))$$

The calculated confidence level can be compared against a threshold value in order to determine whether the detected graphics signal 422 is considered to be valid at a particular moment. The CONF signal may be used by subsequent stages or stored ready for later use, as appropriate. In particular, the CONF signal is useful to control subsequent stages of the system, such as by indicating that a content substitution function should be temporarily suspended.

Figure 4:
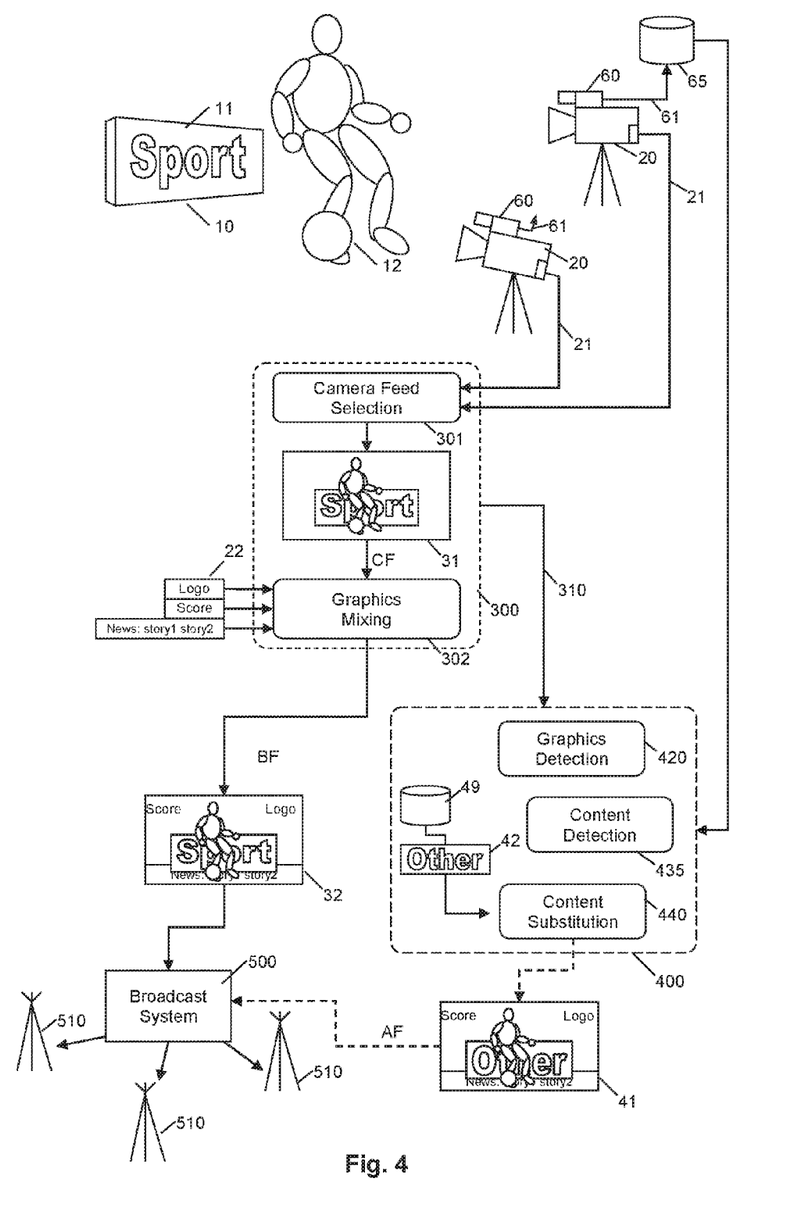
FIG. 4 is a schematic overview of a television broadcasting system.

FIG. 4 is a schematic overview of a television broadcasting system in which example embodiments may be applied. This example includes one or more cameras 20 used to observe one or more subjects 10, a vision mixing system 300, a content replacement system 400, and a broadcast delivery system 500. It will be appreciated that this television broadcasting system has been simplified for ease of explanation and that many other specific configurations will be available to persons skilled in the art.

In the example embodiments, a high value is achieved when images of a sporting event, such as a football or soccer match, are shown live to a large audience. The audience may be geographically diverse, e.g. worldwide, and hence it is desirable to create multiple different alternate broadcast feeds AF for supply to the broadcasting system 500 to be delivered in different territories using local delivery broadcast stations 510, e.g. country by country or region by region. In a live event, the content replacement apparatus 400 should operate reliably and efficiently, and should cause minimal delay (e.g. only by a few frames).

In this example, the content replacement unit 400 is coupled to receive the incoming video images from the vision mixer 300, i.e. using the set of monitoring cables 310, and to supply the amended video images as an alternate feed AF 41 to the broadcast system 500. The graphics detection unit 420 may be provided within the content replacement unit 400, which detects the presence of graphics layers in the incoming video feed and then helps to preserve those graphics layers when producing the alternate feed AF 41.

In one example, the content replacement unit 400 may be provided as a separate and stand-alone piece of equipment, which is suitably connected by appropriate wired or wireless communications channels to the other components of the system as discussed herein. In this case, the content replacement apparatus 400 may be provided in the immediate vicinity of the vision mixer 300, or may be located remotely. As a further example, the content replacement unit 400 might be embodied as one or more software modules which execute using hardware of the vision mixer 300 or by using hardware associated therewith. The content replacement apparatus 400 may receive video images directly from the vision mixer 300, or via one or more intermediate pieces of equipment. The input video images may be recorded and then processed by the content replacement apparatus 400 later, and/or the output images may be recorded and provided to other equipment later.

In the illustrated embodiment, the subject of interest is a billboard 10 which carries original content 11 such as an advertisement (in this case the word "Sport"). The billboard 10 and the original content 11 are provided to be seen by persons in the vicinity. For example, many billboards are provided at a sporting stadium or arena visible to spectators present at the event. In one example, the billboards 10 are provided around a perimeter of a pitch so as to be prominent to spectators in the ground and also in video coverage of the event.

One or more television cameras 20 each observe a scene in a desired field of view to provide a respective camera feed 21. The field of view may change over time in order to track a scene of interest. The camera 20 may have a fixed location or may be movable (e.g. on a trackway) or may be mobile (e.g. a hand-held camera or gyroscopic stabilised camera). The camera 20 may have a fixed lens or zoom lens, and may have local pan and/or tilt motion. Typically, many different cameras 20 are provided to cover the event or scene from different viewpoints, producing a corresponding plurality of camera feeds 21.

The billboard 10 may become obscured in the field of view of the camera 20 by an intervening object, such as by a ball, person or player 12. Thus, the camera feed 21 obtained by the camera 20 will encounter different conditions at different times during a particular event, such as (a) the subject billboard moving into or out of the field of view, (b) showing only part of the subject (c) the subject being obscured, wholly or partially, by an obstacle and/or (d) the observed subject being both partially observed and partially obscured. Hence, there is a difficulty in accurately determining the position of the desired subject 10 within the relevant video images, and so define a masking area or target area where the content within the video images is to be enhanced or modified, such as by being electronically replaced with alternate image content.

In this example, the captured camera feeds 21 are provided, whether directly or indirectly via other equipment, to the vision mixing system 300. Here, the vision mixer 300 may include a camera feed selector function 301 and a graphics overlay mixer function 302. Amongst other functions, the vision mixer 300 may be used to select amongst the camera feeds 21 at each point in time to produce a clean feed (CF) 31, also known as a director's cut clean feed. The vision mixer 300 is typically operated by a skilled vision engineer, who responds to instructions from a director of this transmission. The vision mixing system 300 may incorporate or be coupled to a graphics generator which provides a plurality of graphics layers 22 such as a station logo ("Logo"), a current score ("Score") and a pop-up or scrolling information bar ("News: story1 story2"). Typically, the one or more graphics layers 22 are applied over the clean feed 31 to produce a respective dirty feed or broadcast feed (BF) 32. A separate graphics computer system may produce one or more of the graphics layers 22, and/or the graphics layers 22 may be produced by components within the vision mixer 300 itself. The graphics layers 22 may be semi-transparent and hence may overlap the observed billboard 10 in the video images. The graphics layers 22 may be dynamic, such as a moving logo, updating time or score information, or a moving information bar.

A broadcast feed BF 32 is output to be transmitted as a broadcast feed, e.g. using a downstream broadcast delivery system 500. The feed may be broadcast live and/or is recorded for transmission later. The broadcast feed BF may be subject to one or more further image processing stages, or further mixing stages, in order to generate the relevant eventual feed as seen by viewers, as will be familiar to those skilled in the art. The broadcast delivery system 500 may distribute and deliver the broadcast feed in any suitable form including, for example, terrestrial, cable, satellite or Internet delivery mechanisms to any suitable media playback device including, for example, televisions, computers or hand-held devices. The broadcast feed may be broadcast to multiple viewers simultaneously, or may be transmitted to users individually, e.g. as video on demand.

The content replacement device 400 is arranged to identify relevant portions of video images corresponding to the observed subject of interest. That is, the content replacement unit 400 suitably performs a content detection function 435 to identify target areas or regions within the relevant video images which correspond to the subject of interest. The content replacement unit 400 may also perform a content substitution function 440 to selectively replace the identified portions with alternate content, to produce an alternate feed AF 41 which may then be broadcast as desired. In another example, the content substitution function may be performed later by a separate content substitution unit (also called a 'remote adder' or 'local inserter'). In which case, an intermediate feed may be carried by the system, e.g. as an auxiliary signal stream, from one part to the other over suitable communications networks such as a satellite link or the Internet.

In more detail, the content replacement unit 400 receives suitable video image feeds, and identifies therein a target area relevant to the subject of interest (i.e. the billboard 10). The received images may then be modified so that the subject of interest is replaced with alternate content 42, to produce amended output images 41. In this illustrative example, a billboard 10, which originally displayed the word "Sport", now appears to display instead the alternate content 42, as illustrated by the word "Other".

In the example embodiments, the alternate content 42 comprises one or more still images (e.g. JPEG image files) and/or one or more moving images (e.g. MPEG motion picture files). As another example, the alternate content 42 may comprise three-dimensional objects in a 3D interchange format, such as COLLADA, Wavefront .OBJ or Autodesk 0.3DS file formats, as will be familiar to those skilled in the art. The alternate content 42 is suitably prepared in advance and is recorded on a storage medium 49 coupled to the content replacement apparatus 400. Thus, the content replacement apparatus 400 produces one or more alternate feeds AF where the observed subject 10, in this case the billboard 10, is replaced instead with the alternate content 42. Ideally, the images within the alternate feed AF 41 should appear photo-realistic, in that the ordinary viewer normally would not notice that the subject 10 has been electronically modified. Hence, it is important to accurately determine a masking area defining the position of the billboard 10 within the video images input to the content replacement apparatus 400. Also, it is important to identify accurately when portions of the observed subject 10 have been obscured by an intervening object 12 such as a player, referee, etc. Notably, the intervening object or objects may be fast-moving and may appear at different distances between the camera 20 and the subject 10. Further, it is desirable to produce the alternate feed 41 containing the alternate content 42 in a way which is more agreeable for the viewer, and which is less noticeable or obtrusive. Thus, latency and synchronisation need to be considered, as well as accuracy of image content manipulation.

The example content replacement apparatus 400 is arranged to process a plurality of detector signals 61. In one example embodiment, the detector signals 61 may be derived from the video images captured by the camera 20, e.g. using visible or near-visible light radiation capable of being captured optically through the camera 20, wherein the camera 20 acts as a detector 60. In another example embodiment, one or more detector units 60 are provided separate to the cameras 20.

The detector signals 61 may be derived from any suitable wavelength radiation. The wavelengths may be visible or non-visible. In the following example embodiment, the detector signals 61 are derived from infra-red wavelengths, and the detector signals 61 are infra-red video signals representing an infra-red scene image. Another example embodiment may detect ultra-violet radiation. In one example embodiment, polarised visible or non-visible radiation may be detected. A combination of different wavelength groups may be used, such as a first detector signal derived from any one of infra-red, visible or ultra-violet wavelengths and a second detector signal derived from any one of infra-red, visible or ultra-violet wavelengths.

In the illustrated example embodiment, one or more detectors 60 are associated with the camera 20. In the example embodiment, each camera 20 is co-located with at least one detector 60. The or each detector 60 may suitably survey a field of view which is at least partially consistent with the field of view of the camera 20 and so include the observed subject of interest 10. The detector field of view and the camera field of view may be correlated. Thus, the detector signals 61 are suitably correlated with the respective camera feed 21. In the example embodiment, the detector signals 61 are fed to the content replacement apparatus 400. In the example embodiment, the detector signals 61 are relayed live to the content replacement apparatus 400. In another example embodiment, the detector signals 61 may be recorded into a detector signal storage medium 65 to be replayed at the content replacement apparatus 400 at a later time.

As an example, the one or more detectors 60 may be narrow-spectrum near infra-red (NIR) cameras. The detector 60 may be mounted adjacent to the camera 20 so as to have a field of view consistent with the camera 20. Further, in some embodiments, the detectors 60 may optionally share one or more optical components with the camera 20.

The detector 60 may be arranged to move with the camera 20, e.g. to follow the same pan & tilt motions. In the example embodiment, the cameras 20 may provide a telemetry signal which records relevant parameters of the camera, such as the focal length, aperture, motion and position. In one example, the telemetry signal includes pan and tilt information. The telemetry may also include zoom information or zoom information may be derived from analysing the moving images themselves. The telemetry may be used, directly or indirectly, to calculate or otherwise provide pan, roll, tilt and zoom (PRTZ) information. The camera telemetry signal may be passed to the content replacement system 400, whether directly or via an intermediate storage device, in order to provide additional information about the field of view being observed by each camera 20.

Figure 5:
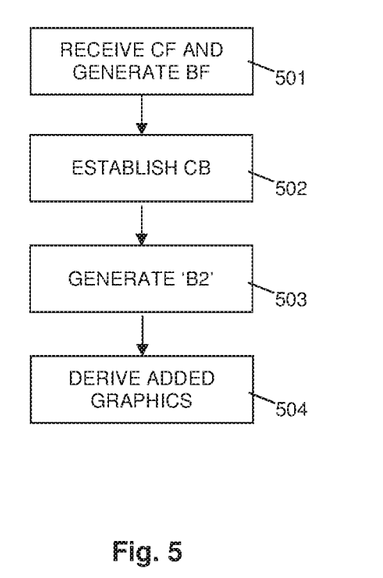
FIG. 5 is a schematic flow diagram of an example method of detecting added graphics layers within a video signal.

FIG. 5 is a schematic flow diagram of an example method for determining added graphics layers in a video image signal. The method may be performed for example by a programmed computer device or by dedicated hardware. The method may include the step 501 of receiving at least a first original image layer, and generating a first composite image having one or more graphics layers mixed into the first original image layer—such as the clean feed CF and the broadcast feed BF discussed above. Step 502 comprises establishing a second original image layer which is different from the first original image layer, such as by considering the constant background signal CB discussed above. Step 503 comprises generating a second composite image 'B2' having the said one or more graphics layers mixed likewise into the second original image layer, again as discussed above. Step 504 comprises deriving an added graphics layer signal (detected graphics signal 422) representing the one or more added graphics layers from the first original image layer, the second original image layer, the first composite image, and the second composite image, and outputting said added graphics layer signal. Optionally, the method includes performing a validation function to confirm that the detected graphics signal 422 has been validly produced, conveniently by calculating a validation signal such as the 'CONF' signal as discussed above.

In one example, this method is suitable for use in for use in a dynamic image content manipulation process as discussed herein. In particular, the content of an image is modified is some way by introducing alternate or additional image content. A dynamic method is preferred in that the image content may change significantly from frame to frame, such as for a live television broadcast which selects amongst multiple cameras with varying image contents. Conveniently, the validation function may cause the dynamic image content manipulation to be temporarily suspended, so as to avoid producing an invalid modified image.

The devices and system described herein are well adapted to be integrated with existing commercial equipment. As a result, the system is more flexible to operate in relation to a program signal or broadcast feed which may have been modified in multiple phases already. This minimises commercial and logistic constraints toward integrating the system with the existing equipment. Further, the inputs required of the system have been minimised, thus reducing the number of signals which need to be extracted from the existing equipment in order to produce the desired signal streams, as discussed above.

As a further advantage, the system allows the alternate content to be semi-transparent, whilst preserving semi-transparency of previously added graphics overlays. This provides a richer and more appealing visual result in the modified program signals. As a result, viewers are more likely to find the added alternate content visually appealing and integrated with the original signal. Thus, a better photorealistic result can be achieved.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A graphics detector device to detect one or more graphics layers which have been added into a video signal by a vision mixer, wherein the device comprises a processor and a memory and is configured to:
receive the video signal from the vision mixer having the graphics layers added therein, and a first original image signal into which the graphics layers were added by the vision mixer to produce the video signal;
establish a constant background signal which is shared with the vision mixer;
obtain a second composite image signal having the graphics layers added into the constant background signal likewise to the video signal;
derive a detected graphics signal from the video signal, the first original image signal, the constant background signal, and the second composite image signal, wherein the detected graphics signal represents the one or more graphics layers which have been added into the video signal; and
output the detected graphics signal onto a tangible non-transient recording medium.

2. The graphics detector device of claim 1, wherein the first original image signal is a clean feed signal formed by selecting between a plurality of camera feed signals.

3. The graphics detector device of claim 2, wherein the video signal is a broadcast feed signal having the one or more graphics layers mixed into the clean feed signal.

4. The graphics detector device of claim 1, wherein the constant background signal is provided co-ordinatedly within both the graphics detector device and the vision mixer.

5. The graphics detector device of claim 1, wherein the constant background signal is a constant colour signal.

6. The graphics detector device of claim 1, wherein the constant background signal is communicated from the graphics detector device to the vision mixer.

7. The graphics detector device of claim 1, wherein the constant background signal is established independently but equivalently in the vision mixer and in the graphics detector device.

8. The graphics detector of claim 1, wherein the graphics detector device is configured to receive both the video signal and the second composite image signal from the vision mixer, wherein the one or more graphics layers have been added identically into the video signal and into the second composite image signal by the vision mixer.

9. The graphics detector device of claim 1, wherein the graphics detector device is configured to derive the detected graphics signal using triangulation matting.

10. The graphics detector device of claim 1, wherein deriving the detected graphics signal comprises, assuming an RGB colour space and considering at each pixel position in a frame of the first original image signal as $R_{k1}$ $G_{k1}$ $B_{k1}$, the constant background signal as $R_{k2}$ $G_{k2}$ $B_{k2}$, the video signal as $R_1$ $G_1$ $B_1$, and the second composite image signal as $R_2$ $G_2$ $B_2$, for the four unknowns $R_o$ $G_o$ $B_o$ $\alpha_o$ representing the added graphics layers, solving a system of six equations:

$$R_1 = \alpha_o R_o + (1-\alpha_o) R_{k1}$$

$$R_2 = \alpha_o R_o + (1-\alpha_o) R_{k2}$$

$$G_1 = \alpha_o G_o + (1-\alpha_o) G_{k1}$$

$$R_2 = \alpha_o G_o + (1-\alpha_o) G_{k2}$$

$$R_1 = \alpha_o B_o + (1-\alpha_o) B_{k1}$$

$$R_2 = \alpha_o B_o + (1-\alpha_o) B_{k2}.$$

11. The graphics detector device of claim 1, being further configured to perform a validation function using the detected graphics signal to detect transient deviations in the video signal, and outputting a validation signal in response thereto.

12. The graphics detector device of claim 11, wherein the validation function comprises at least one of:
generating a first reconstructed composite image signal by combining the first original image signal with the detected graphics signal, and comparing the first reconstructed composite image signal with the video signal to provide a first validation indicator; and
generating a second reconstructed composite image signal by combining the constant background signal with the detected graphics signal, and comparing the second reconstructed composite image signal with the second composite video signal to provide a second validation indicator.

13. The graphics detector device of claim 12, wherein the first and second validation indicators are first and second peak signal-to-noise ratios, PSNRs, respectively, and the validation signal is a minimum of the first and second PSNRs.

14. A system for determining added graphics layers in a video image signal, comprising:
- a vision mixer configured to produce at least a first original image signal comprising a first original image layer, a first composite image signal having one or more graphics layers mixed into the first original image layer, and a second composite image signal having said one or more graphics layers mixed likewise into a second original image layer which is distinct from the first original image layer; and
- a graphics detector device coupled by communication links to the vision mixer to receive at least said first original image signal, said first composite image signal, and said second composite image signal and configured to output an added graphics layer signal representing said one or more graphics layers, the added graphics layer signal being derived from the first original image layer, the second original image layer, the first composite image signal, and the second composite image signal.

15. A method for determining added graphics layers in a video image signal, comprising:

receiving at least a first original image layer, and a first composite image having one or more graphics layers mixed into the first original image layer, establishing a second original image layer which is different from the first original image layer;

obtaining a second composite image having said one or more graphics layers mixed likewise into the second original image layer;

deriving a detected graphics signal representing the one or more added graphics layers from the first original image layer, the second original image layer, the first composite image, and the second composite image; and outputting said detected graphics signal onto a tangible non-transient recording medium.

* * * * *